United States Patent [19]

Stofko, Jr. et al.

[11] Patent Number: 5,565,518

[45] Date of Patent: Oct. 15, 1996

[54] WATER SOLUBLE ORGANOSILOXANE COMPOUNDS

[75] Inventors: John J. Stofko, Jr., St. Paul; Jeffery C.Y. Chang, North Oaks, both of Minn.

[73] Assignee: Minnesota Mining and Manufacturing Company, St. Paul, Minn.

[21] Appl. No.: 552,271

[22] Filed: Nov. 2, 1995

Related U.S. Application Data

[62] Division of Ser. No. 138,810, Oct. 19, 1993, Pat. No. 5,464,900.

[51] Int. Cl.$^6$ ............................ C08L 83/00; C07F 7/10
[52] U.S. Cl. .................... 524/837; 524/858; 524/838; 556/423
[58] Field of Search ............................ 524/837, 838, 524/858; 556/423

[56] References Cited

U.S. PATENT DOCUMENTS

| | | | |
|---|---|---|---|
| 3,402,191 | 9/1968 | Morehouse et al. | 260/448.2 |
| 3,535,112 | 10/1970 | Dolce et al. | 96/1.4 |
| 3,539,340 | 11/1970 | Dolce et al. | 96/1.4 |
| 3,565,936 | 2/1971 | Morehouse | 260/448.2 |
| 4,005,117 | 1/1977 | Heckert et al. | 260/448.8 R |
| 4,052,368 | 10/1977 | Larson | 260/75 S |
| 4,065,245 | 4/1978 | De Vito et al. | 428/215 |
| 4,071,362 | 1/1978 | Takemaka et al. | 96/1.4 |
| 4,177,175 | 12/1979 | Baney et al. | 260/29.2 M |
| 4,299,422 | 3/1981 | Davidson et al. | 430/17 |
| 4,480,003 | 10/1984 | Edwards et al. | 428/329 |
| 4,489,122 | 12/1984 | Kammin et al. | 428/212 |
| 4,681,561 | 8/1987 | Imai et al. | 428/141 |
| 4,686,549 | 8/1987 | Williams et al. | 503/227 |
| 4,690,959 | 9/1987 | Plueddemann | 523/213 |
| 4,724,004 | 2/1988 | Saito | 106/287.12 |
| 4,800,125 | 1/1989 | Plueddemann | 428/405 |
| 4,819,010 | 4/1989 | Kohashi et al. | 346/76 |
| 4,847,237 | 7/1989 | Vanderzanden | 503/227 |
| 4,869,955 | 9/1989 | Ashcraft et al. | 428/327 |
| 4,898,786 | 2/1990 | Swofford | 428/480 |
| 4,912,009 | 3/1990 | Amering et al. | 430/137 |
| 4,927,950 | 5/1990 | Hisamoto et al. | 556/419 |
| 4,952,650 | 8/1990 | Young et al. | 526/194 |
| 4,956,223 | 9/1990 | Arai et al. | 428/212 |
| 5,022,944 | 6/1991 | Swofford et al. | 156/244.11 |
| 5,064,722 | 11/1991 | Swofford et al. | 428/447 |
| 5,104,731 | 4/1992 | Gager | 428/323 |

FOREIGN PATENT DOCUMENTS

| | | | |
|---|---|---|---|
| 0301827A2 | 2/1989 | European Pat. Off. | G03C 1/80 |
| 0349227A2 | 1/1990 | European Pat. Off. | G03G 7/00 |
| 0389200A2 | 9/1990 | European Pat. Off. | B41M 5/38 |
| 0408197A2 | 1/1991 | European Pat. Off. | G03G 7/00 |
| 0442567A2 | 8/1991 | European Pat. Off. | G03G 7/00 |
| 57-42741 | 3/1982 | Japan | C08K 5/00 |
| 1-289838 | 11/1989 | Japan | C08J 7/04 |

Primary Examiner—Melvyn I. Marquis
Assistant Examiner—Karen A. Dean
Attorney, Agent, or Firm—Gary L. Griswold; Walter N. Kirn; Carolyn V. Peters

[57] ABSTRACT

Water soluble organosiloxane compounds are provided comprising an oligomer incorporating an addition product of at least two reactants wherein one reactant is at least one 3-glycidoxypropylalkoxy siloxane and the other reactant is at least one secondary hydroxyalkyl amine, optionally, an alkoxysilane different than 3-glycidoxypropylalkoxysilane; optionally, a primary or secondary amine different than the secondary hydroxyalkyl amine; and water.

5 Claims, No Drawings

WATER SOLUBLE ORGANOSILOXANE COMPOUNDS

This is a division of application Ser. No. 08/138,810 filed Oct. 19, 1993 now U.S. Pat. No. 5,464,900.

TECHNICAL FIELD

This invention relates to organosiloxane compounds and more particularly to water soluble organosiloxane compounds useful in composite films and as coupling agents, primers and antistatic coatings.

BACKGROUND OF THE INVENTION

There are many commercially available organosiloxane coupling agents useful to improve bonding between different materials. For example, coupling agents may be used to promote adhesion between a filler and a resin in the manufacturing of composite films, or they are coated onto film surfaces to promote adhesion to other materials and/or surfaces.

Generally, siloxanes are hydrolyzed in water and can be applied to surfaces of a substrate by any conventional in-line method, such as spray coating or roll coating. Once the siloxane coating has dried, the resulting primed surface is receptive to direct extrusion coating with one or more polymers.

Additionally, siloxanes are particularly useful as coupling agents in the production of thermoplastic composite materials and unsaturated polyester composite materials. Siloxanes can also be used as primers in adhering thermoplastic resins or unsaturated polyester resins to various substrates.

U.S. Pat. No. 4,177,175 discloses a pigment-free aqueous coating dispersion of an organothiolsesquioxane and colloidal silica for used as an adhesion additive for silane resins having a low degree of substitution. The coating solution can be applied to solid substrates such as polymeric sheets by conventional methods of flowing, spraying or dipping, to form a continuous film.

SUMMARY OF THE INVENTION

In one aspect of the present invention water-soluble organosilane compounds are provided comprising an oligomer incorporating at least one addition product of at least two reactants wherein one reactant is at least one 3-glycidoxypropylalkoxysilane and the other reactant is at least one secondary hydroxyalkyl amine wherein the addition product has the formula:

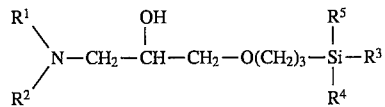

wherein
at least one of $R^1$ or $R^2$ is a hydroxyalkyl group having 2–8 carbon atoms, preferably 2–6 carbon atoms, and further $R^1$ and $R^2$ can each be different or the same and include, for example, methyl, ethyl, hydroxy-ethyl, 2- and 3-hydroxpropyl, 2-, 3- and 4-hydroxybutyl, and 2, 3, 4, 5, 6-penta hydroxyhexyl;
$R^3$ is an alkoxy group having 1–4 carbon atoms; and
$R^4$ and $R^5$ can each be an alkyl group having 1–4 carbon atoms and/or an alkoxy group having 1 to 4 carbon atoms.

The addition product is formed by the reaction of the secondary hydroxy alkyl amine and a 3-glycidoxypropylalkoxy silane, wherein the reactants are either undiluted or in solution. Furthermore, the addition product can comprise additional reactants and are selected to enhance the properties of oligomers prepared from such addition products. For example, secondary amines different than the secondary hydroxyalkyl amine used as the second reactant in the addition product can be added to the reaction mixture (comprised of the reactants) to enhance the wetting characteristics of the oligomer or co-oligomer. Prior to oligomerization, the addition product of the above can be mixed with one or more additional alkoxysilanes, thereby forming co-oligomers. Oligomers or co-oligomers are provided when the addition product is dissolved in water, wherein it is presumed $R^3$ is hydrolyzed, thereby producing predominantly siloxane linkages from the silanols.

In another aspect of the present invention, an aqueous coating solution is provided comprising:
(a) the addition product described above; wherein the addition product can optionally comprise one or more alkoxysilanes different than 3-glycidoxypropylalkoxysilane; and
(b) a colloidal dispersion having a pH greater than 7.

These oligomers can be easily coated out of an aqueous solution onto polymeric substrates without additional priming of the surface of the polymeric substrate and provide excellent adhesion to polymeric substrates. When the oligomers are blended with a colloidal dispersion having a pH of greater than 7, they form stable aqueous coating solutions. These solutions can also be easily coated onto unprimed polymeric films to provide clear coatings with low haze and good antistatic properties.

Preferred coating solutions comprise from about 25 parts to about 95 parts by weight of the organosilane oligomer, and from about 75 parts to about 5 parts by weight of a colloidal dispersion in an aqueous media, such that the components add up to 100 parts by weight.

Although there are numerous water soluble organosilane compounds suitable for priming polymeric surfaces for adhesion enhancement, the present invention provides a novel class of water soluble organosilane compounds advantageously useful as primers and coupling agents that (1) can be coated from an aqueous medium, (2) can be blended with a colloidal dispersion to produce a stable coating solution, (3) is capable of forming a transparent coating on a polymeric surface, (4) can be coated to give a film with good antistatic properties, and (5) can be used to produce dry, clear and low haze overhead transparencies.

As used in this application:
"(meth)acrylate" refers to both acrylate and methacrylate and "(meth)acrylic acid" refers to both acrylic acid and methacrylic acid;
"co-oligomer" means an oligomer produced by the simultaneous oligomerization of two or more dissimilar alkoxysilanes; and
"oligomer" refers to a homooligomer and can be used interchangeably with co-oligomer.

DESCRIPTION OF THE PREFERRED EMBODIMENT(S)

The water soluble organosilane coupling agent of the present invention comprises an oligomer incorporating at least one addition product of at least two reactants, wherein one reactant is a 3-glycidoxypropylalkoxysilane and a second reactant is at least one secondary hydroxyalkylamine and the addition product has the following formula:

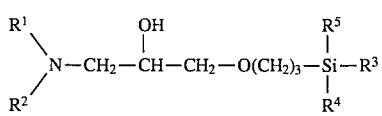

wherein at least one of $R^1$ or $R^2$ is a hydroxyalkyl group having 2–8 carbon atoms, preferably 2–6 carbon atoms, and further $R^1$ and $R^2$ can each be different or the same and include, for example, methyl, ethyl, hydroxy-ethyl, 2- and 3-hydroxpropyl, 2-, 3- and 4-hydroxybutyl, and 2, 3, 4, 5, 6-penta hydroxyhexyl;

$R^3$ is an alkoxy group having 1–4 carbon atoms; and $R^4$ and $R^5$ can each be an alkyl group having 1–4 carbon atoms and/or an alkoxy group having 1 to 4 carbon atoms.

The addition product is the result of the reaction of a secondary amine and 3-glycidoxypropylalkoxysilane, wherein the reactants are either undiluted or in solution. Oligomers are formed when the addition products are dissolved in water, wherein it is presumed $R^3$ is hydrolyzed producing predominately siloxane linkages from the silanols.

Prior to the formation of the oligomer, the addition product of the present invention can be mixed with one or more alkoxy silanes, which in turn becomes part of a co-oligomer. Other alkoxy silanes include methyltrimethoxy silane, vinyltrimethoxy silane, dimethyldiethoxy silane, methacryloxypropyltrimethoxy silane, glycidoxypropyltrimethoxy silane, mercaptopropyltrimethoxy silane, chloropropyltrimethoxy silane, bromopropyltrimethoxy silane, iodopropyltrimethoxy silane, chloromethyltrimethoxy silane, and mixtures thereof. Preferably, other alkoxy silanes include methyltrimethoxy silane, dimethyldiethoxy silane, methacryloxypropyl trimethoxy silane and addition products of dialkylamine and glycidoxypropyl trimethoxysilane, and more preferably, addition products of dipropylamine and glycidoxypropyl trimethoxysilane.

The addition product can be comprised of reactants in addition to the first and second reactants described above to enhance the properties of oligomers prepared from such addition product. For example, the wetting characteristics of coating compositions can be enhanced by adding of small quantities of primary or secondary amines to the reaction mixture that are more hydrophobic than those described above. The coating compositions thus formed have very good wetting characteristics for polyester film surfaces and addition of surfactants to the coating composition can either be decreased or eliminated. These hydrophobic amines include dipropylamine, diallylamine, Jeffamine T-403 (a trifunctional polyoxyalkyleneamine commercially available from Texaco Chemical). The amount of hydrophobic amines can be up to the amount of the more hydrophilic amines, e.g., equal amounts of hydrophobic and hydrophilic amines in the reaction mixture.

When additional reactants are added to the reaction mixture, the first and second reactants, that is, 3-glycidoxypropylalkoxysilane and secondary hydroxy-alkylamine are present from about 30 parts to about 98 parts by weight of the reaction mixture, preferably from about 60 parts to about 95 parts by weight of the reaction mixture. The amount of additional amine should not destabilize the aqueous oligomer solution.

The oligomers or co-oligomers produced from the addition products are stable in aqueous solution, even when additional alkoxysilane reactants are not. The oligomers tend to lower the coefficient of friction of coatings when coated on the surface of most polymeric film. The oligomers also reduce the tendency of the coated film to stain when annotated with water soluble markers and enhance the performance of a coated film. This is especially advantageous when such coated films are used as receptive films for imaging or as overhead transparencies.

When the oligomers or co-oligomers are used as a coupling agent, a surfactant can be optionally added to provide good wetting, although co-oligomers prepared with additional amines typically exhibit good wetting without using an additional surfactant. The surfactants are typically added after the oligomers or co-oligomers are formed, but prior to the coating of the polyester substrate. Preferred surfactants include Triton™ X-100 (commercially available from Union Carbide), and fluorochemical surfactants such as

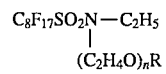

wherein n is from about 6 to about 15 and R can be hydrogen or methyl. Useful examples include Fluorad™ FC-170C and Fluorad™ FC-171 (commercially available from 3M). The amount and type of surfactants depends on the specific interfacial interactions between the coating composition and the surface of the polymeric films.

For use as coupling agent, the oligomers or co-oligomers, without using a colloidal dispersion can be coated onto polymeric films to provide a clear coating. Coatings useful for xerographic printing can be prepared using the oligomer or co-oligomers in combination with a colloidal dispersion. When used in a coating composition, the oligomers or co-oligomers are present from about 5 parts to about 95 parts by weight of the coating composition, preferably, from about 25 parts to about 75 parts by weight, and more preferably, from about 40 parts to about 60 parts by weight. Below 5 parts by weight, the coating composition tends to form brittle and hazy coatings with poor adhesion to polymeric film, especially when higher coating weights are applied. At the higher end, for example greater than about 95 parts by weight, the coating composition tends to be sticky, have poor adhesion to the polymeric substrate, and diminished antistatic properties.

The oligomers or co-oligomers are easily blended with a colloidal dispersion without coagulation or agglomeration of the colloidal particles to form an aqueous coating solution. Colloidal particles in the colloidal dispersion are present from about 5 parts to 95 parts by weight, preferably, from about 25 parts to 75 parts by weight and more preferably, from about 40 parts to 60 parts by weight of the coating layer. The pH of the colloidal dispersion is greater than 7. The colloidal particles useful in the present invention include colloidal silica particles such as nanometer-sized silica particles in a basic environment including Nalco colloidal silicas (commercially available from Nalco Chemical Company); Ludox HS, LS, AS, AM, and SM colloidal silicas (commercially available from DuPont); and SnowTex Colloidal Silica (commercially available from Nissan Chemical Industry, Ltd.); colloidal alumina sols such as Dispal™ 23N4–20, available from Vista Chemicals; colloidal tin oxide sols such as Nyacol™ DP5730, available from Nyacol Products, Inc.

The resultant coating is insoluble in water and organic solvents and possesses good antistatic properties without addition of additional antistatic agents. When used as antistatic coatings, the surface resistivity of a typical coating can range from about $10^{10}\Omega$/sq. to about $10^{15}\Omega$/sq., with the typical surface resistivity being around $10^{13}\Omega$/sq.

Besides their utility as primers, coupling agents, and antistatic coatings, these coating compositions of the present invention can also be useful as fog resistant coatings, image receptive coatings, stain resistant coatings, solvent resistant coatings, and abrasive resistant coatings.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent. The following Examples set forth synthetic procedures for the invention, which is clearly set forth above and the procedures, with the selection of the appropriate reagents is believed to be able to enable the synthesis of the generic class of compounds described hereinabove and recited in the claims that follow this description.

EXAMPLES

Test Methods

Surface Resistivity

Surface conductivity of the coated film was measured using a Model 240A High Voltage Supply, available from Keithley Instruments, along with a Model 410A Picoamrneter and a Model 6105 Resistivity Adapter. The film samples prepared were 8.75 cm×8.75 cm in size and were conditioned by sitting at 23° C. at 50% RH overnight. The surface conductivity is then measured by placing between the 2 capacitor plates and applying a 500 volt charge ("500V"). The surface conductivity is measured in amperes and reported in surface resistivity according to the equation:

$$R=(53.4\times 500V)/l$$

wherein "l" is the measured amperes.

| Glossary | |
|---|---|
| DEA | diethanolamine |
| GPTMS | 3-glycidoxypropyltrimethoxysilane commercially available from Hüls America, Inc. and from Union Carbide under the trade designation A187 |
| Nalco 1030 | colloidal silica having an average particle size of 13 nm and 30% solids with a pH of 10.2 commercially available from Nalco Co. |

EXAMPLE 1

Synthesis of an oligomer incorporating an addition product of DEA and GPTMS Was carried out in the following manner:

23.6 grams of GPTMS, 10.5 grams of DEA, and 5 grams of isopropanol were placed in a flask and stirred rapidly at room temperature to initiate the reaction. Initially, the reaction was heterogenous, but after about 5 to 10 minutes, a clear, one phase viscous liquid was formed. After the mixture was stirred for about ½ an hour at room temperature, the mixture was heated in a hot water bath for another ½ hour at 40° to 45° C. After the mixture was removed from the hot water bath, the liquid was stirred for an additional ½ hour before adding 110 grams of water to hydrolyze the methoxy groups. Assuming that all the methoxy groups were hydrolyzed, an approximately 20% solid solution of the coupling agent was produced.

EXAMPLE 2

A coating of the coupling agent on polyester film was carried out in the following way:

0.1 gram of a 1% solution of Triton X-100 surfactant (available from Union Carbide) in water was added to 10 grams of the 20% solution of the oligomer prepared in Example 1. The resulting mixture was coated onto an 125 μm thick, unprimed, biaxially-oriented polyethylene terephthalate (PET) film using a #12 Meyer Rod. The coating was dried for 5 minutes at 110° C. to give a clear coating. When held in a stream of hot water at a temperature of about 82° C., the coating was not washed away or delaminated from the PET film surface. The surface of the film was slightly tacky, and vigorous rubbing with a wet paper towel only succeeded in marring of the surface.

EXAMPLE 3

10 grams of Nalco 1030 was diluted with 20 grams of deionized water in a vessel. This was mixed with 20 grams of a 10% solution of the oligomer prepared in Example 1 to provide a solution of 3:2 silica/oligomer. The resultant mixture was slightly hazy, but no settling or agglomeration was observed even after three weeks at room temperature. To this mixture was then added 0.5 gram of a 1% solution of Triton X-100 surfactant (available from Union Carbide). After allowing to stand at room temperature for about one hour, the mixture was knife-coated at a 75 mm wet thickness onto unprimed PET film. The coating was dried for 5 minutes at 110° C. to produce a clear, non-tacky film. The film coating remained intact when washed with a stream of hot water. When the surface was vigorously rubbed with a wet paper towel, no marring was visible or apparent.

COMPARATIVE EXAMPLE 4C

This was carried out in the same manner as Example 3, except a commercially available silane, GPTMS (commercially available from Hüls America, Inc.) only was used. Within 15 minutes of mixing with Nalco 1030, a fine white solid began to precipitate from the mixture, showing that a stable coating solution was not possible.

EXAMPLE 5

This was made in the same manner as Example 3, except that 10 grams of Nalco 1030 were added to 1.5 grams of the oligomer solution prepared in Example 1 to form a coating mixture with a 10:1 ratio of silica to oligomer. The resultant film was transparent and the coating remained on the PET film after washing with hot water.

COMPARATIVE EXAMPLE 6C AND EXAMPLE 7

8.5 grams of DEA, 1.5 grams of dipropylamine (available from Aldrich Chemical), 23.6 grams of GPTMS and 5 grams of isopropanol were mixed together and stirred in a reacting vessel, and the reaction was carried out in the same manner as Example 1. At the end of the reaction, 110 grams of water were added to generate Example 6C, and 30 grams of water were added to generate Example 7. Example 6C formed a hazy mixture after standing for 10 hours at room temperature. Example 7 was also allowed to stand for 10 hours, before 80 grams of water were added to form a clear solution. Two (2) grams each of the prepared 20% solutions were then diluted with 6 grams of water, followed by the addition of 2 grams of Nalco 1030 silica to form a dispersion having a 10% solids content. These solutions were then coated onto a 100 μm PET film using a #8 Meyer rod. The solution of Example 6C did not wet the PET film and after drying, the film surface had a discontinuous coating.

On the other hand, the solution of Example 7 formed a clear coating, which was then dried in an oven at 110° C. for 5 minutes. The coating adhered to the PET film.

EXAMPLES 8–10

These coating compositions were prepared in the same manner as Example 7, except diallylamine (1.5 grams, Example 8), dibutylamine (1.5 grams, Example 9), and Jeffamine T-403 (0.75 grams, Example 10, a trifunctional polyoxyalkyleneamine commercially available from Texaco Chemical) were added to the solutions, respectively instead of the dipropylamine. The coating composition of Example 9 appeared to be unstable (precipitation appeared in the composition) after 4 or 5 days. The coating compositions of Examples 8 and 10 showed no sign of instability after 6 months. The solutions were coated in the same manner as described in Example 7 and clear coatings with good adhesion to PET resulted.

EXAMPLES 11–13

These coating compositions were prepared in the same manner as Example 3 except different particle size distributions and different ratios of oligomer to colloidal dispersion were used. The differences between the various particle sizes in the colloidal dispersion and ratios are summarized in Table 1. All the solutions provided clear coatings and good adhesion to PET film.

TABLE 1

| Examples | Ratio of Oligomer:Dispersion | Mean Particle Size of Colloidal Silica |
|---|---|---|
| 11 | 3:2 | 4 nm |
| 12 | 3:2 | 60 nm |
| 13 | 9:1 | 60 nm |

These examples showed that varying (1) particle sizes of the colloidal silica in the dispersions and (2) concentrations can produced acceptable coatings.

COMPARATIVE EXAMPLES 14C–15C

These coating compositions were prepared in the same manner as Examples 2 (without a colloidal dispersion) and 3 (with a colloidal dispersion) respectively, except 3-bis-hydroxyethylaminopropyltriethoxysilane (available from Petrarch Chemical) was used in place of the addition product of the present invention. The coatings was easily rubbed off the PET film using a wet paper towel.

EXAMPLES 16–22

These coating compositions were prepared according to the following general procedure using varying amounts of several optional hydrophobic alkoxysilanes. The different alkoxysilanes and respective amounts are summarized in Table 2. Clear coatings with good adhesion to PET were generated.

General Procedure

Examples 16–22 were prepared according to following general procedure:

23.6 grams of GPTMS, 10.5 grams of DEA and 5 grams of isoporpanol were reacted as in Example 1. Before any water was added, an optional hydrophobic alkoxysilane was added to the reaction mixture followed by only 25 grams of water. The mixture was allowed to stand for 8 to 10 hours, and then diluted to a final concentration of 20% solids by addition of more water. The types and amounts of optional hydrophobic alkoxysilanes evaluated are summarized in Table 2. The oligomer solutions were used to make 3:2 silica/oligomer coating compositions, as described in Example 7. Clear coatings with good adhesion to polyester were generated. No surfactant was required for good wetting of the polyester substrate during the coating process.

TABLE 2

| Examples | Hydrophobic silanes added | Amounts of added amines (g) |
|---|---|---|
| 16 | methyltrimethoxysilane | 6.8 |
| 17 | dimethoxydiethoxysilane | 7.4 |
| 18 | 3-chloropropyltrimethoxy silane | 9.9 |
| 19 | vinyltriethoxysilane | 9.5 |
| 20 | chloromethyltriethoxy silane | 10.6 |
| 21 | iodopropyltrimethoxy silane | 14.5 |
| 22 | methyltrimethoxysilane and dimethyldiethoxysilane | 3.4 and 3.7 |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. An aqueous coating solution comprising:
    (a) a water soluble organosilance oligomer prepared by dissolving in water an alkoxy silane comprising an alkoxy shane addition product at least two reactants wherein:
        (i) the first reactant is at least one 3-glycidoxypropylalkoxysilane and
        (ii) the second reactant is at least one second hydroxylalkyl amine,
    wherein the alkoxy silane addition product has the formula:

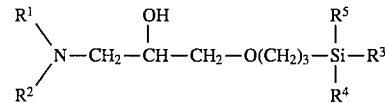

wherein
    at least one of $R^1$ or $R^2$ is a hydroxyalkyl group having 2–8 carbon atoms, and $R^1$ and $R^2$ can each be different or the same;

$R^3$ is an alkoxy group having 1–4 carbon atoms; and $R^4$ and $R^5$ can each be an alkyl group having 1–4 carbon atoms, or an alkoxy group having 1 to 4 carbon atoms, and
        (iii) optionally, a third reactant, wherein the reactant is an alkoxysilane different than 3-glycidoxypropylalkoxysilane; and
    (b) a colloidal dispersion having a pH greater than 7.

2. The aqueous coating solution according to claim 1 wherein the colloidal dispersion comprises colloidal silica.

3. The aqueous coating solution according to claim 1 wherein the addition product further comprises a fourth reactant, wherein the fourth reactant comprises one or more secondary amines different than the secondary hydroxyalkyl amine of the second reactant, 4. The aqueous coating according to claim 1 further comprising a third component, wherein the third component (c) is a surfactant.

5. The aqueous coating solution according to claim 1 wherein the alkoxysilane is selected from the group consisting of methyltrimethoxy silane, dimethyldiahyoxy silane, methacryloypropyl trimethoxy silane and addition products of dialkylamine and glycidoxyltrimethoxysilane.

\* \* \* \* \*